L. S. CHICHESTER.
Grain Dryer.
No. 110,896.
Patented Jan. 10, 1871.
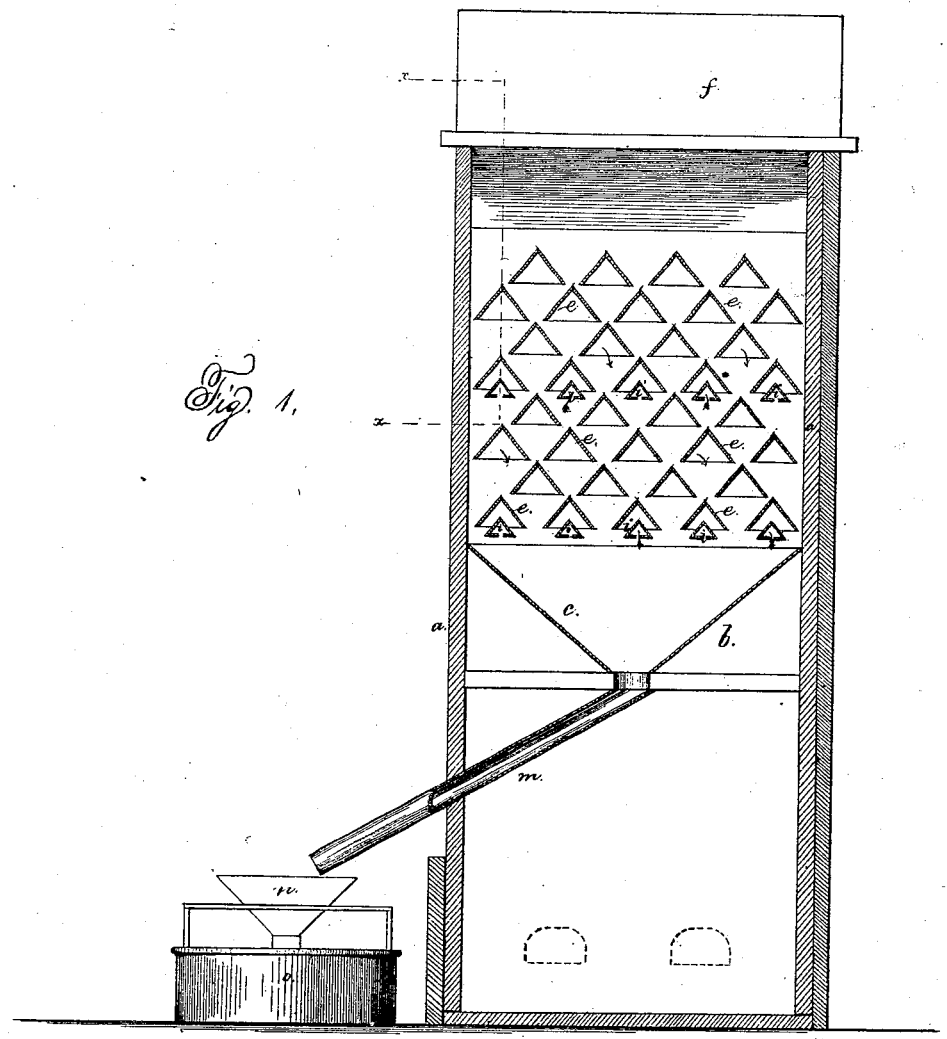
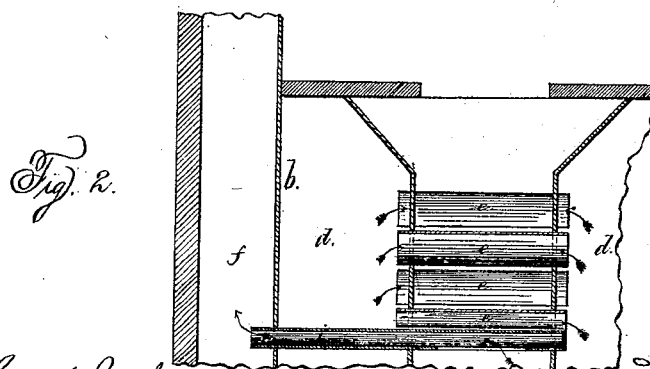

UNITED STATES PATENT OFFICE.

LEWIS S. CHICHESTER, OF BROOKLYN, NEW YORK.

IMPROVEMENT IN GRAIN-DRIERS.

Specification forming part of Letters Patent No. 110,896, dated January 10, 1871.

*To all whom it may concern:*

Be it known that I, LEWIS S. CHICHESTER, of Brooklyn, in the county of Kings and State of New York, have invented and made a new and useful Improvement in Drying and Grinding Grain; and the following is declared to be a correct description of the same.

In grain-driers heretofore made some portions of the grain are liable to be operated upon by the heat to a greater extent than others; and that is especially the case where the heated air enters one side of a range of air-tubes and passes off upon the other side to an escape flue or chimney, as in Letters Patent No. 47,596, May 2, 1865.

Besides this, in the grinding of grain difficulty arises from either too much moisture of the flour or from the dry, hard, and brittle character of the hull. If the grain is not thoroughly dried, and should be ground in very cold weather, the moisture will be retained; and this is a prolific source of sour flour coming from northern latitudes. If the hull is dry, hard, and brittle, it breaks into small pieces, the millstones become dull and clogged, and considerable flour adheres to the hulls.

My invention is made with reference to overcoming both the before-named objections; and consists in a vertical bin for containing the grain, with openings for hot air to pass in from each side, in combination with escape-pipes opening within the grain-chamber and leading to an escape flue or chimney, so that the grains in all parts of the bin are exposed to the same amount of heat and the vapors are conveyed away with uniformity.

I have also discovered that when the grain has been subjected to the action of artificial heat in a mass, so as to drive off the moisture through escape-openings, the hulls are not of that flinty, brittle nature that they are when in the ordinary condition in which they are ground, because, ordinarily, the hull becomes very dry, and the moisture may remain in the center of the wheat; but when grain is exposed to an artificial heat for drying while in a mass, as in my drier, the grain is first dried at the center, and the moisture passing off from the grain leaves the hull in a comparatively soft, pliable condition, so that the hulls will be cracked open by the action of the millstones, and will flatten out and pass off between the stones without being broken into small pieces. I therefore apply to the drier a grinding-mill, so that the grain is taken to the same and ground while the hulls are in the condition aforesaid. This mode of treating the grain also insures great dryness in the flour, as the vapors pass off rapidly in the grinding operation should any remain, because the wheat is in a warm condition.

In the drawing, Figure 1 is a vertical section of my improved apparatus, and Fig. 2 is a partial section at the line $x\ x$.

The grain-bin is formed with the sides $a\ a$ and ends $b\ b$, connected with the hopper-shaped bottom $c$.

The hot-air spaces $d\ d$ on each side of the bin connect through the open ends beneath the inclined tables $e\ e$, so that the air can pass freely and uniformly into the grain from both sides of the bin.

The pipes $i\ i$ pass into the bin from the escape flue or chimney $f$, and are provided with longitudinal openings or perforations in their under sides, so as to receive the air and moisture and convey it away to the chimney as the same rises from the grain, thus insuring a sufficient circulation of air to effect the drying of the grain, and retaining the heat and causing it to act with efficiency upon the grain.

From the hopper $c$ the grain is conveyed away to the grinding-mill in the warm condition aforesaid, so that the hulls may peel off and not be broken up into small pieces, as and for the purposes aforesaid.

I have shown the spout $m$ connecting from the hopper $c$ to the hopper $n$ of the grinding-mill $o$.

I claim as my invention—

The arrangement of the hot-air flues at each side of the grain-bin, and with which the air-spaces beneath the tables $e\ e$ open at both ends, in combination with the pipe $i\ i$, passing to the flue $f$, and provided with openings in their sides within the grain-bin, as and for the purposes set forth.

Signed by me this 23d day of September, A. D. 1870.

LEWIS S. CHICHESTER.

Witnesses:
 CHAS. H. SMITH,
 GEO. T. PINCKNEY.